(12) United States Patent
Miller et al.

(10) Patent No.: US 11,651,101 B2
(45) Date of Patent: *May 16, 2023

(54) MULTI-PERSONA ENROLLMENT MANAGEMENT

(71) Applicant: VMware, Inc., Palo Alto, CA (US)

(72) Inventors: Matthew Donald Miller, Decatur, GA (US); Adarsh Subhash Chandra Jain, Roswell, GA (US)

(73) Assignee: VMware, Inc., Palo Alto, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/936,670

(22) Filed: Jul. 23, 2020

(65) Prior Publication Data

US 2020/0349282 A1   Nov. 5, 2020

Related U.S. Application Data

(63) Continuation of application No. 15/824,167, filed on Nov. 28, 2017, now Pat. No. 10,733,322.

(51) Int. Cl.
*H04L 9/40* (2022.01)
*G06F 21/62* (2013.01)

(52) U.S. Cl.
CPC .......... *G06F 21/6245* (2013.01); *H04L 63/08* (2013.01); *H04L 63/102* (2013.01); *H04L 63/20* (2013.01); *G06F 2221/2149* (2013.01)

(58) Field of Classification Search
CPC ......... G06F 21/6245; G06F 2221/2149; H04L 63/102; H04L 63/20; H04L 63/08

USPC .......................................................... 726/1
See application file for complete search history.

(56) References Cited

U.S. PATENT DOCUMENTS

| | | | |
|---|---|---|---|
| 6,223,177 B1 * | 4/2001 | Tatham | G06Q 10/10 707/999.009 |
| 8,108,494 B1 * | 1/2012 | Holland | H04L 67/22 709/204 |
| 8,924,545 B2 | 12/2014 | Orr et al. | |
| 9,203,845 B2 | 12/2015 | Webber et al. | |
| 9,213,860 B2 | 12/2015 | Everett et al. | |
| 9,432,323 B2 * | 8/2016 | Geris | H04L 51/24 |
| 9,716,753 B2 | 7/2017 | Piyush et al. | |

(Continued)

*Primary Examiner* — Amare F Tabor
(74) *Attorney, Agent, or Firm* — Thomas | Horstemeyer LLP

(57) ABSTRACT

Examples of multi-persona account management in client devices are described. A client device can host a personal workspace, such as for personal data and applications of a user, along with a separate alternate persona workspace for work-related data and applications of the user. The client device interfaces with a management computing environment to enroll in device management services and establish the alternate persona workspace on the client device. In one example, the client device queries a management computing environment to establish an alternate persona workspace in the client device. The client device then creates the alternate persona workspace in the client device based on a response from the management computing environment, associates an alternate persona account with the alternate persona workspace, and receives a notification to install at least one application in the alternate persona workspace from an account administration environment of the alternate persona account.

14 Claims, 4 Drawing Sheets

(56) References Cited

U.S. PATENT DOCUMENTS

| | | |
|---|---|---|
| 9,852,310 B1 | 12/2017 | Goodspeed et al. |
| 9,998,446 B2 * | 6/2018 | Branden ............. H04L 63/0807 |
| 10,001,913 B2 * | 6/2018 | von Muhlen ........... H04L 67/04 |
| 10,171,378 B2 * | 1/2019 | Mahajan ............... H04L 47/783 |
| 10,187,393 B2 | 1/2019 | Odenheimer et al. |
| 10,637,723 B2 * | 4/2020 | Kelley ................. H04L 67/306 |
| 10,771,553 B2 * | 9/2020 | Huang ................ H04L 67/1097 |
| 2008/0086766 A1 | 4/2008 | Kaler et al. |
| 2011/0219078 A1 * | 9/2011 | Beresford-Wood .... G06F 15/16 709/205 |
| 2014/0150109 A1 | 5/2014 | Fire et al. |
| 2014/0366157 A1 | 12/2014 | Yancey et al. |

\* cited by examiner

MULTI-PERSONA ENROLLMENT MANAGEMENT

CROSS-REFERENCE TO RELATED APPLICATIONS

This application is a continuation of U.S. patent application Ser. No. 15/824,167, titled "Multi-Persona Enrollment Management," filed Nov. 28, 2017, the complete disclosure of which is hereby fully incorporated herein by reference.

BACKGROUND

Mobile devices are being used for access to enterprise computing systems and resources with greater frequency. With the growing number of different mobile devices, platforms, and operating systems available for adoption by users, various challenges can arise in the management of the mobile devices.

Mobile device management platforms can be relied upon to facilitate certain challenges associated with the management of large numbers of mobile devices using a central administration console. For example, the distribution, installation, and access to a suite of applications on a number of mobile devices can be managed using the administration console. Further, access to the functions performed and data processed by the applications can be managed through the administration of the suite of applications based on a set of management policies, compliance rules, and configuration data which is defined and enforced by the administration console.

In many cases, employees and personnel can be ahead of the curve when it comes to the adoption of new mobile devices and related technology. The proliferation of tablet and smartphone devices, for example, has resulted in a number of companies and organizations allowing employees to bring their own devices to work. The use of these personal devices can be associated with productivity gains and cost savings. The concept "bring your own device" (BYOD) for access to enterprise computing systems may have met initial resistance due to security concerns, but more and more companies are now looking to incorporate BYOD policies.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
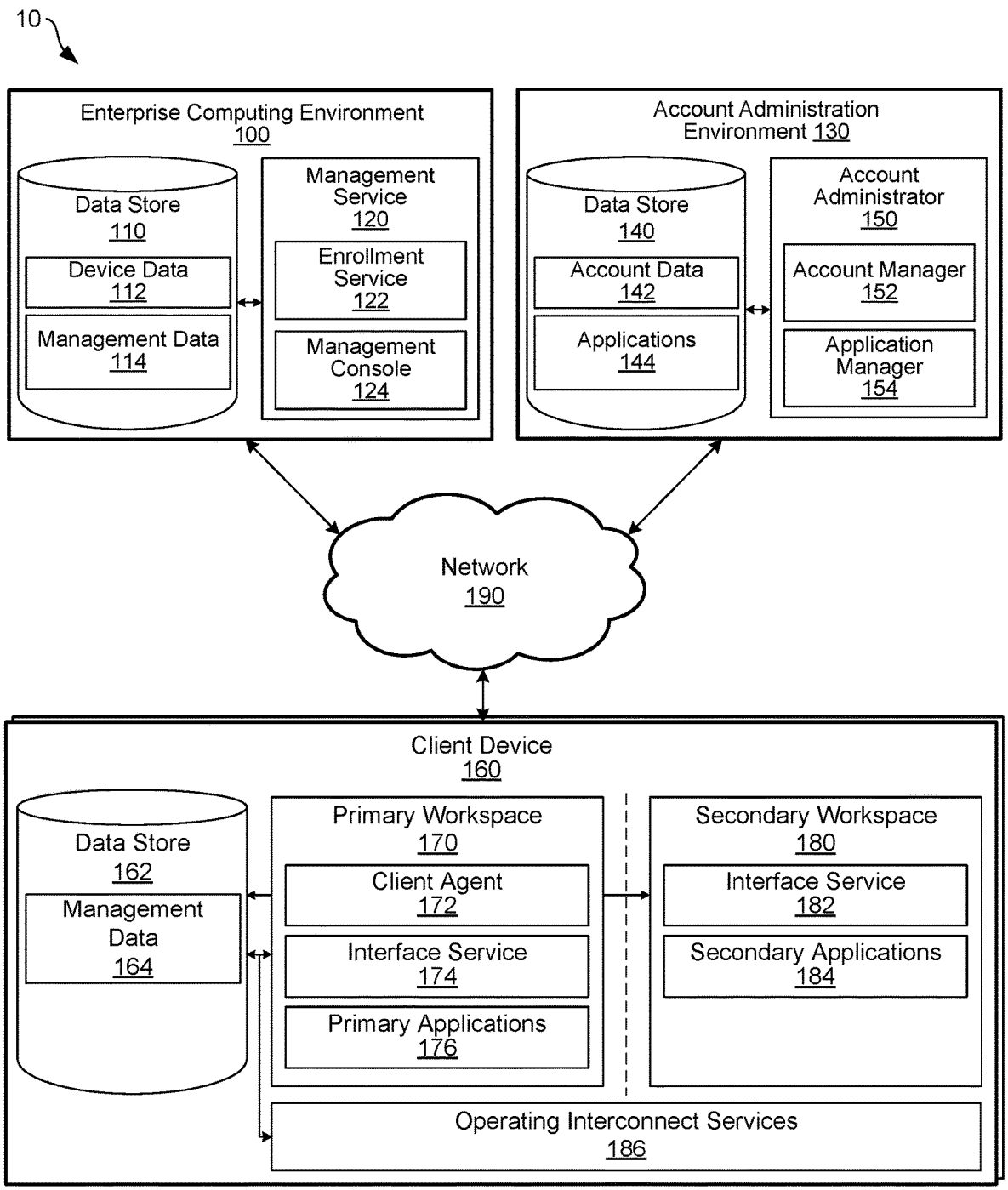
FIG. 1 illustrates an example networked environment for multi-persona enrollment management according to various examples described herein.

As noted above, mobile devices are being used for access to enterprise computing systems and resources with greater frequency, and mobile device management platforms can be relied upon to manage large numbers of mobile devices using a central administration console. For example, the distribution, installation, and access to a suite of applications on a number of mobile devices can be managed using the administration console. Further, access to the functions performed and data processed by the applications can be managed through the administration of the suite of applications based on a set of management policies, compliance rules, and configuration data which is defined and enforced by the administration console.

Some organizations permit personnel to use their own devices (e.g., "bring your own device" (BYOD)) for access to enterprise computing systems. These users may desire to maintain separate workspaces to segregate their personal applications and data, for example, from their work-related applications and data. To that end, a mobile device can instantiate a secondary, alternate persona workspace that exists separately from the primary, personal persona workspace for the user of the mobile device. In this case, the mobile device management platform should be capable of administering the suite of applications installed on the alternate persona workspace, in addition to controlling access to the functions performed and data processed by the applications, which can be challenging based on access restrictions maintained for alternate persona workspaces in the operating system platforms of mobile devices.

In the context outlined above, examples of multi-persona account management in client devices are described. In one example, a client device can host a personal workspace, such as a workspace for personal data and applications, along with a separate, alternate persona workspace for work-related data and applications. To achieve and facilitate that arrangement, the client device can interface with a management computing environment to enroll in device management services. Based on the direction of an administrator of the management services, for example, and a request or query from a user of the client device, the management computing environment can direct the client device to create an alternate persona workspace on the client device.

According to one example, when a user of a client device seeks to establish an alternate persona workspace on the client device, the management computing environment can create or establish an alternate persona account for the user. The alternate persona account can be established in part through network communications with an account administration environment separate from both the client device and the management computing environment. The management computing environment can conduct network communications with the account administration environment to create a new user account for the alternate persona. When the account is created, the management computing environment can receive a token associated with the new account from the account administration environment and forward the token to the client device.

In turn, the client device can receive the token for the alternate persona workspace from the management computing environment, create the alternate persona workspace in the client device, and install an interface service in the alternate persona workspace. The client device can also associate the alternate persona account with the alternate persona workspace using the token and return a service identifier to the management computing environment. The management computing environment can remotely administer applications installed in the alternate persona workspace using the service identifier.

Turning to the drawings, the following paragraphs provide an outline of a networked environment for multi-persona enrollment management followed by a discussion of the operation of the same. FIG. 1 illustrates an example networked environment 10 for multi-persona enrollment management according to various examples described herein. The networked environment 10 includes an enterprise computing environment 100, an account administration environment 130, a number of client devices 160, and a network 190.

The enterprise computing environment 100 can be embodied as one or more computers, computing devices, or computing systems. In certain embodiments, the enterprise computing environment 100 can include one or more computing devices arranged, for example, in one or more server or computer banks. The computing device or devices can be located at a single installation site or distributed among different geographical locations. The enterprise computing environment 100 can include a plurality of computing devices that together embody a hosted computing resource, a grid computing resource, or other distributed computing arrangement. In some cases, the enterprise computing environment 100 can be embodied as an elastic computing resource where an allotted capacity of processing, network, storage, or other computing-related resources varies over time. As further described below, the enterprise computing environment 100 can also be embodied, in part, as certain functional or logical (e.g., computer-readable instruction) elements or modules as described herein.

The enterprise computing environment 100 can operate as an environment for mobile device management environment of the client devices 160. In that context, the computing environment 100 includes a data store 110 and a management service 120. The data store 110 includes areas in memory for the storage of device data 112 and management data 114, among other types of data. The management service 120 includes an enrollment service 122 and a management console 124, among other functional components.

The enrollment service 122 can enroll a number of the client devices 160 for mobile device management services. To begin enrollment, the enrollment service 122 can identify and authenticate one of the client devices 160 and store data related to the client device 160 in the device data 112 for later reference. In some cases, the management service 120 (or a management client agent executing on the client device 160) can also be registered as a device administrator (at least in part) of the client device 160, permitting the management service 120 to configure and manage certain operating aspects of the client device 160 as described in further detail below.

Once the client device 160 is enrolled for device management by the management service 120, the management service 120 can direct the installation of various software components or applications on the client device 160. The software components can be configured on the client device 160 at the direction of the management service 120. Such software components can include, for example, applications, resources, libraries, and other related components.

The management service 120 can also transfer various management policies, compliance rules, and configuration data for execution by and/or enforcement on the client device 160. In that context, during or after enrollment, the management service 120 can retrieve a set of management policies, compliance rules, and configuration data for the client device 160 from the management data 114 and transfer those policies, rules, and data to the client device 160 for reference by the operating system and certain applications executing on the client device 160.

The management console 124 can be embodied as an engine and console interface for device management of the client devices 160. An information technology administrator or user, for example, can view, administer, and update the management policies, compliance rules, and configuration data on the client devices 160 using the management console 124. The policies, rules, and configuration data can be collectively administered for a number of the client devices 160 by organizing the client devices 160 into a number of different groups or categories of devices according to organizational or other factors or considerations. The management console 124 can also be relied upon to create and administer additional personas or workspaces on the client devices 160, such as for those of the client devices 160 that are BYOD devices. The management console 124 can further administer the applications installed the different workspaces on the client devices 160. The operations of the management console 124 in the context of multi-persona enrollment management are described in further detail below.

The account administration environment 130 can be embodied as one or more computers, computing devices, or computing systems. Similar to the enterprise computing environment 100, the account administration environment 130 can include one or more computing devices arranged, for example, in one or more server or computer banks. The computing device or devices can be located at a single installation site or distributed among different geographical locations. The account administration environment 130 can include a plurality of computing devices that together embody a hosted computing resource, a grid computing resource, or other distributed computing arrangement. The account administration environment 130 can also be embodied, in part, as certain functional or logical (e.g., computer-readable instruction) elements or modules as described herein.

The account administration environment 130 can be embodied as a computing environment for the administration of user accounts associated with users of the client devices 160. The account administration environment 130 includes a data store 140 and an account administrator 150. The data store 140 includes areas in memory for the storage of account data 142 and applications 144, among other types of data. The account administrator 150 includes an account manager 152 and an application manager 154, among other functional components. Although shown together in one environment, the functions performed by the account manager 152 and the application manager 154 can be split among different computers, computing devices, or computing systems.

The account manager 152 can be embodied as an engine to facilitate the creation of user accounts associated with the client devices 160. For example, when a user first activates one of the client devices 160, the client device 160 can request that the user create a logon, including a username and password, for access to the client device 160 and the applications 144 available for installation on the client device 160. The account manager 152 can ensure that unique usernames and passwords are maintained for different users and devices, and store data related to the users, the client devices 160 associated with those users, and other relevant data in as the account data 142.

The application manager 154 can be embodied as an engine and interface to allow the client devices 160 to search for and install the applications 144. The applications 144 can include any type of applications, such as e-mail clients, messaging clients, document editors or viewers, file browsers, and other applications. Users of the client devices 160 can interface with network pages, for example, generated by the application manager 154 to search among the applications 144 for download and installation. Alternatively, the client devices 160 can include a standalone application (e.g., an application store) to interface with the application manager 154 to search among the applications 144. In certain cases, the application manager 154 can push applications and application updates down to the client devices 160, possibly using a notification service.

As a mobile device management function, the enterprise computing environment 100 can interface with the account administration environment 130 to control which applications are visible or available to users of the client devices 160. For example, the management service 120 can interface with the application manager 154 to control which ones of the applications 144 are visible (or not visible) to the client devices 160 during searches. This type of control can be directed by a mobile device administrator using the management console 124. As directed through the management console 124, the management service 120 can interface with the application manager 154 to control the availability of the applications 144 individually for each client device 160 or collectively for groups of the client devices 160. The management service 120 can also control which ones of the applications 144 are available for download and installation, required to be installed, and capable or permitted to be uninstalled on the client devices 160. The management service 120 can also control which ones of the applications 144 are pushed down for installation on the client devices 160, possibly using a notification service. The management can take place, in part, using one or more application blacklists, whitelists, or other types of manifests of permitted and/or unpermitted applications.

As described in further detail below, the management service 120 can direct the application manager 154 to administer the installation of one or more of the applications 144 to a number of different workspaces on the client devices 160, including personal and work-related workspaces. The management service 120 can also direct the application manager 154 to control which applications 144 are available for download and installation to personal workspaces, for individual ones or groups of the client devices 160, in a manner that is different than for work-related workspaces on those client devices 160.

The client devices 160 are representative of one or more client devices. Each client device 160 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 160.

As illustrated in FIG. 1, an example client device 160 includes a data store 162, having an area for the storage of management data 164, among other types of data. The client device 160 also includes a primary workspace 170, a secondary workspace 180, and one or more operating interconnect services 186. The primary workspace 170 includes a client agent 172, an interface service 174, and a number of primary applications 176. The secondary workspace 180 includes an interface service 182 and a number of secondary applications 184.

In the data store 162, the management data 164 can include management policies, compliance rules, configuration data, and other data received from the enterprise computing environment 100 for management of the client device 160. The management data 164 can also include account tokens and account service identifiers for the creation and administration of the secondary workspace 180 as described below. Although not separately shown in FIG. 1, the data store 162 can also store other data, such as the primary applications 176 and the secondary applications 184, among other executable code. The primary applications 176 are illustrated in FIG. 1 as applications for execution in the primary workspace 170, and the secondary applications 184 are illustrated as applications for execution in the secondary workspace 180.

In the primary workspace 170, the client agent 172 can be embodied as an agent of the enterprise computing environment 100 for mobile device management of the client device 160. Additionally, the interface service 174 can be embodied as a type of service agent of the client agent 172. In that role, the interface service 174 can extend the reach of mobile device management from the primary workspace 170 to the secondary workspace 180. For example, the interface service 174 can be relied upon by the client agent 172 to create the secondary workspace 180, install the associated interface service 182 in the secondary workspace 180, and interface with the secondary workspace 180. Once the secondary workspace 180 is created and the interface service 182 installed, the interface service 174 can conduct inter-process communications with the interface service 182.

The primary applications 176 and the secondary applications 184 are representative of various types of applications or application-related components that can be executed on the client device 160. As examples, the primary applications 176 and the secondary applications 184 can include hypertext-based network browsers, e-mail clients, messaging clients, document editors or viewers, file browsers, among other applications for other purposes.

The primary workspace 170 can be a logically separate personal workspace, such as a workspace for personal data and applications of a user of the client device 160, as compared to the secondary workspace 180, which can be used for work-related data and applications of the user. The logical separation (e.g., separate memory spaces, limited interface calls, limited inter-process communications, and other separations) between the primary workspace 170 and the secondary workspace 180 can be maintained in part by the operating system executing on the client device 160, such as by enforcement through the operating interconnect services 186, which can be embodied as various services provided by the operating system of the client device 160.

As noted above, the client device 160 can be enrolled by the management service 120 for device management. Through network communications between the enterprise computing environment 100 and the client device 160, the enrollment service 122 can identify and authenticate the client device 160 and store data related to the client device 160 in the device data 112 for later reference.

As part of the enrollment process, the management service 120 and/or client agent 172 can be registered as a device administrator of the client device 160, permitting the management service 120 and/or client agent 172 to manage certain operating aspects of the client device 160. In either case, the management service 120 can remotely configure the client device 160 by interacting with the client agent 172. The management service 120 can also transfer various software components to the client device 160, and those software components can be installed and/or configured on the client device 160 at the direction of the client agent 172. Such software components can include, for example, applications, resources, libraries, drivers, device configurations, or other related components. The management service 120 can also transfer various management policies, compliance rules, and configuration data for enforcement on the client device 160, and those policies, rules, and data can be stored as the management data 164. The management service 120 can then instruct the client agent 172 and the operating system of the client device 160 to enforce the management policies, compliance rules, and configuration data stored in the device management data 36.

The network 190 can include the Internet, intranets, extranets, wide area networks (WANs), local area networks (LANs), wired networks, wireless networks, cable networks, satellite networks, other suitable networks, or any combinations thereof. As one example, the computing environment 100 and the client devices 160 can be respectively coupled to one or more public or private LANs or WANs and, in turn, to the Internet for communication of data among each other. Although not shown in FIG. 1, the network 190 can also include communicative connections to any number and type of network hosts or devices, such as website servers, file servers, cloud computing resources, databases, data stores, or any other network or computing architectures.

In the networked environment 10, the enterprise computing environment 100, the account administration environment 130, and the client devices 160 can communicate data among each other over the network 190 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

According to the concepts of multi-persona enrollment management described herein, the example client device 160 shown in FIG. 1 can be a device owned by a user in which the primary workspace 170 has been established and populated with the primary applications 176 and other data for personal use of the user. The client device 160 can be enrolled with the enterprise computing environment 100 for mobile device management after the primary workspace 170 has been established. In that scenario, the user of the client device 160 may wish to create the secondary workspace 180 on the client device 160 to maintain separation between personal and work-related applications and data.

Depending upon the scenario, the secondary workspace 180 can be created when the client device 160 is first enrolled with the enterprise computing environment 100, or the secondary workspace 180 can be created at some time after the client device 160 is enrolled with the enterprise computing environment 100. The secondary workspace 180 can be created or approved for creation, in either case, at the direction of the user of the client device 160 and/or the administrator of the management service 120 through the management console 124.

To create the secondary workspace 180, the management service 120 is configured to communicate with the account administrator 150 using one or more application programming interfaces (API), for example, to create an alternate persona account to be associated with the secondary workspace 180. The alternate persona account can be established for the particular purpose of the administration of the secondary workspace 180. The alternate persona account can be established using a newly-created logon associated with a username, password, certificate, or other identifying information defined or determined by the management service 120. Once created, the management service 120 can use the logon to control which ones of the applications 144 are available for download and installation to the secondary workspace 180 on the client devices 160. The account administrator 150 can return a token related data package to the management service 120. The token can be embodied as data including an identifier of the newly-created alternate persona account. In some cases, the token can also include data to authenticate the user or owner of the newly-created alternate persona account. The token can be stored in the device data 112.

The management service 120 is configured to forward the token received from the account administrator 150 to the client device 160. Once the token is received, the client agent 172 can direct the interface service 174 to establish the secondary workspace 180. The interface service 174 can establish the secondary workspace 180 through one or more services of the operating system of the client device 160, and the operating system of the client device 160 can recognize the interface service 174 as the administrator or owner of the secondary workspace 180. The interface service 174 can also direct the installation of the interface service 182 within the secondary workspace 180 as a corresponding component for execution in the secondary workspace 180.

When the secondary workspace 180 is established, the interface service 174 can be configured to create a programming interface through (or as part of) the operating interconnect services 186 for inter-process communications (IPC) between the interface service 174 and the secondary workspace 180. The programming interface can be defined using an interface definition language, such as the Android® interface definition language (AIDL) or related interface definition language. The programming interface can be agreed upon for communication by both the interface service 174 and the operating interconnect services 186 and provide a communications pathway between the interface service 174 and the interface service 182.

After the secondary workspace 180 is established, it can be associated with the alternate persona account created by the management service 120. The token for the alternate persona account, which was received by the management service 120 from the account administrator and forwarded to the client device 160, can be passed by the interface service 174 to the interface service 182. The interface service 182 can then communicate with the account administrator 150 to associate the alternate persona account with the secondary workspace 180 with reference to the token. As part of that association process, the account administrator 150 can return an account services identifier to the interface service 182. The account services identifier is a unique identifier for the secondary workspace 180 in association with the alternate persona account and can be tied to an account or device codename for the client device 160.

The interface service 182 is configured to return the account services identifier to the interface service 174, and the interface service 174 is configured to return it to the management service 120. The management service 120 can then use the account services identifier to remotely administer which ones of the applications 144 are visible or available for installation on the secondary workspace 180. The management service 120 can also control which ones of the applications 144 are available for download and installation, required to be installed, and capable or permitted to be uninstalled on the secondary workspace 180. The management service 120 can also control which ones of the applications 144 are pushed down for installation on the secondary workspace 180, possibly using a notification service. The management can take place, in part, using one or more application blacklists, whitelists, or other types of manifests of permitted and/or unpermitted applications.

Figure 2:
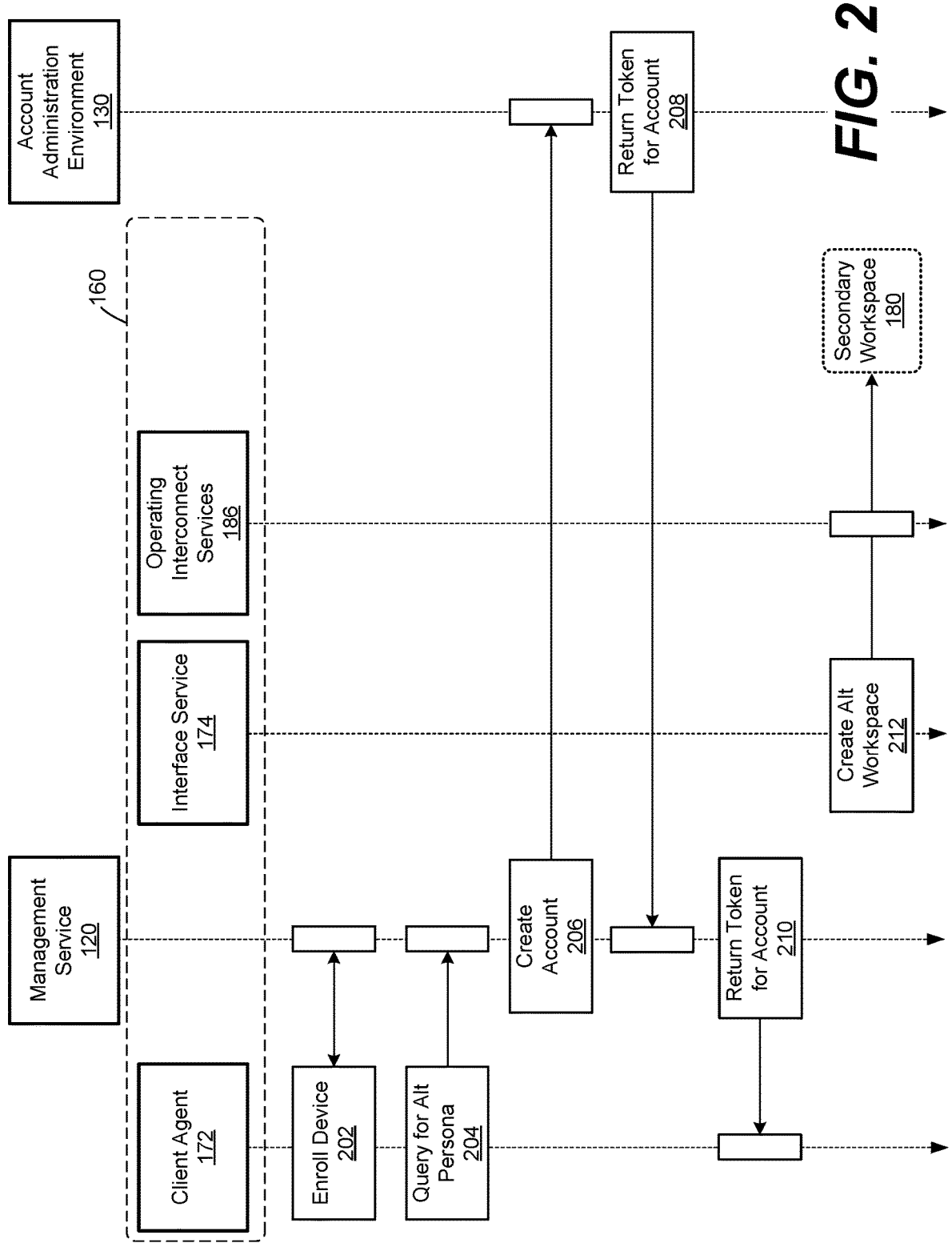
FIG. 2 illustrates a process for multi-persona enrollment management according to various examples described herein.
Figure 3:
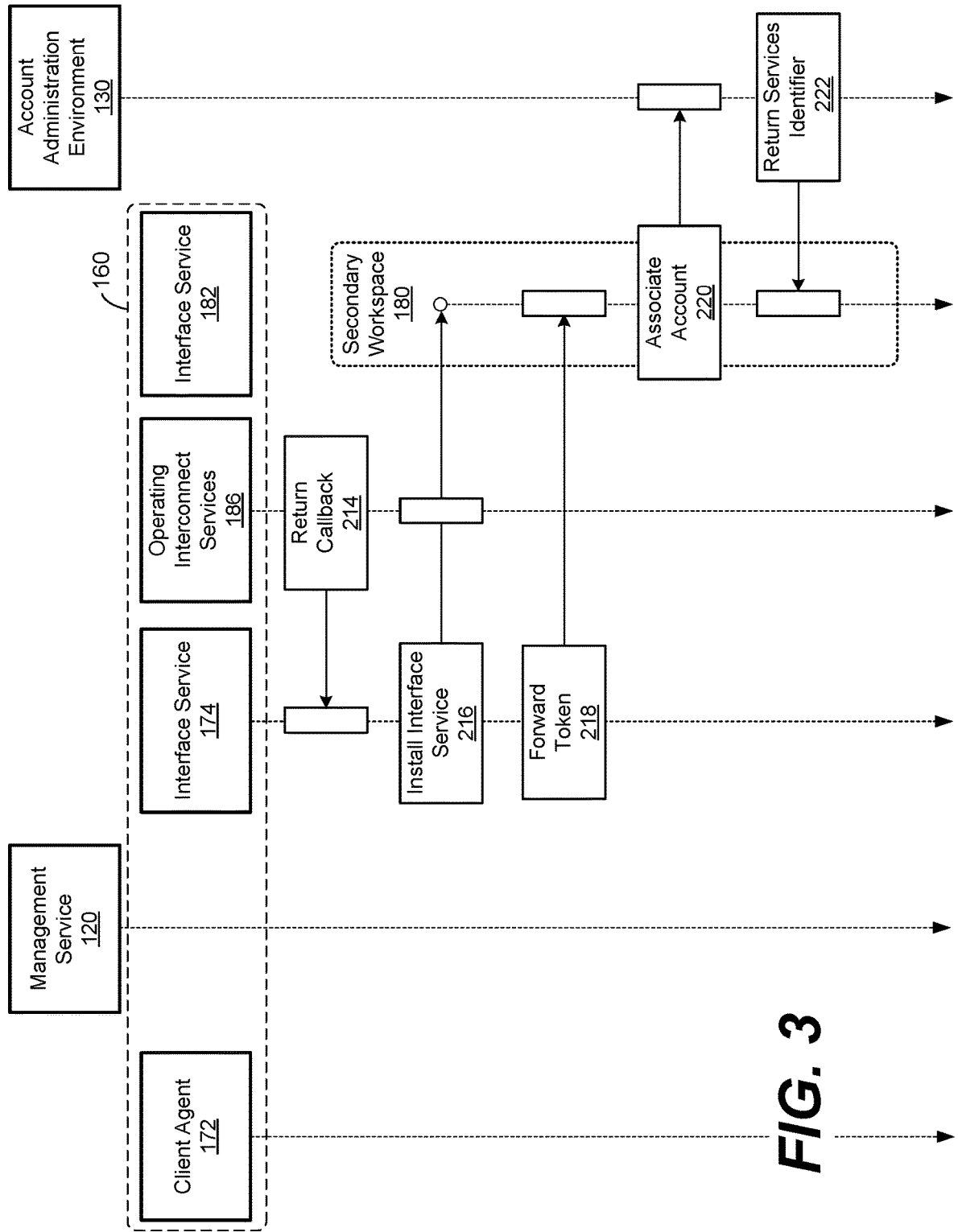
FIG. 3 further illustrates the process for multi-persona enrollment management shown in FIG. 2 according to various examples described herein.
Figure 4:
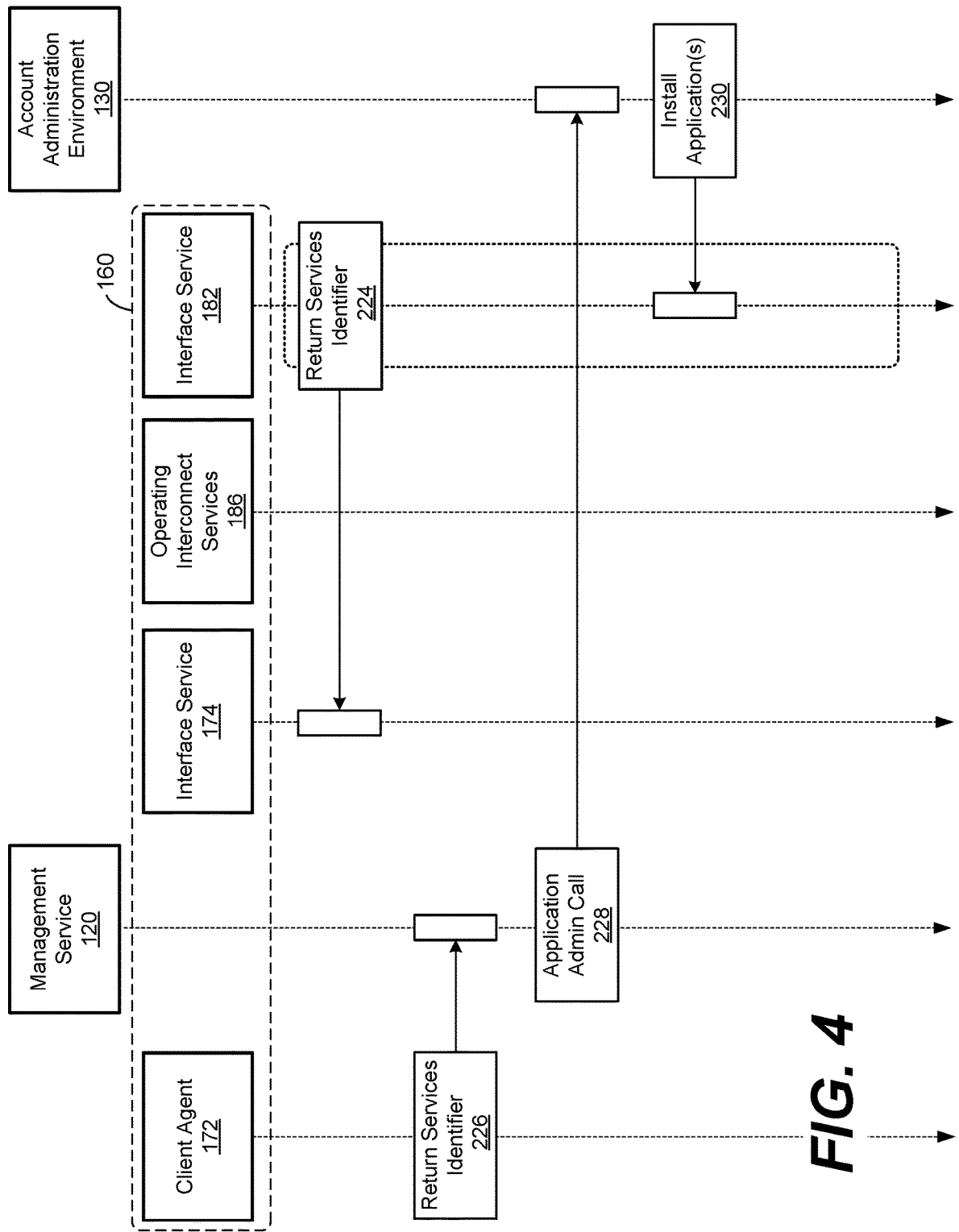
FIG. 4 further illustrates the process for multi-persona enrollment management shown in FIGS. 2 and 3 according to various examples described herein.

FIGS. 2-4 illustrate a process for multi-persona enrollment management according to various examples described herein. Individual steps of the process shown in FIGS. 2-4 can be performed by the enterprise computing environment 100, the account administration environment 130, and the client device 160 as described below. According to the example outlined with reference to FIGS. 2-4, the process results in the secondary workspace 180 being established on the client device 160. The process also results in the ability for the management service 120 to control or administer which of the applications 144 hosted by the account administration environment 130 are capable of being installed (or are installed) as the secondary applications 184 on the client device 160. The process can also be performed by other client devices and computing environments, however, and is not limited to use with the networked environment 10. Additionally, although the flowcharts show an order of execution, the order of execution can differ from that which is shown. For example, the order of execution of two or more elements can be switched relative to the order shown or as described below. Also, two or more elements shown in succession can be executed concurrently or with partial concurrence. Further, in some examples, one or more of the elements shown in the flowcharts can be skipped or omitted.

Turning to FIG. 2, the process can include the client device 160 enrolling in mobile device management services with the management service 120 of the enterprise computing environment 100 at step 202. The enrollment service 122 can enroll the client device 160 by identifying and authenticating the client device 160 and storing data related to the client device 160 in the device data 112 for later reference. The management service 120 and/or the client agent 172 can also be registered as a device administrator of the client device 160 at step 202, permitting the management service 120 to configure and manage certain operating aspects of the client device 160 as described above.

At step 204, the process can include the client device 160 querying the management service 120 to establish an alternate persona workspace on the client device 160. The query at step 204 sets into motion a number of steps leading to the creation of secondary workspace 180 in the client device 160 as described herein. In one example, the query can be directed by a user of the client device 160 or automatically prompted by the client agent 172 during or at any time after the enrollment at step 202. Alternatively, the querying at step 204 can be omitted, and the creation of secondary workspace 180 can be directed by a mobile device administrator using the management console 124.

At step 206, the process includes the management service 120 creating an alternate persona account to be associated with the secondary workspace 180, which may not yet be created, on the client device 160. The alternate persona account can be established by the management service 120 through communication with the account administrator 150 using one or more application programming interfaces (API) over the network 190. The alternate persona account can be established using a newly-created logon associated with a username, password, certificate, or other identifying information defined or determined by the management service 120. At later steps in the process, the management service 120 can use the logon to control which ones of the applications 144 are available for installation on the secondary workspace 180 of the client devices 160.

At step 208, the process can include the account administrator 150 returning a token or other data package to the management service 120 as an identifier for and/or access key to the alternate persona account created at step 206. The management service 120 can store the token as part of the device data 112 associated with the client device 160 for later reference.

At step 210, the process can include the management service 120 returning the token or other data package from the account administrator 150 back to the client device 160. In the client device 160, the token can be stored as part of the management data 164, and the client agent 172 and the interface service 174 can use the token to associate the alternate persona account with the secondary workspace 180, which may not yet be created.

At step 212, the process can include the client agent 172 directing the interface service 174 to create the secondary workspace 180. The interface service 174 can create the secondary workspace 180 by interfacing with the operating interconnect services 186, which can be embodied as one or more services provided by the operating system of the client device 160. Because it is created according to a request from the interface service 174, the operating system of the client device 160 can recognize the interface service 174 as the administrator or owner of the secondary workspace 180. Alternatively, the client agent 172 can be configured to create the secondary workspace 180 directly, and the interface service 174 can be omitted or combined with the client agent 172.

When the secondary workspace 180 is established as part of step 212, the interface service 174 can be configured to create a programming interface through (or as part of) the operating interconnect services 186 for inter-process communications (IPC) between the interface service 174 and the secondary workspace 180. The programming interface can be defined using an interface definition language, such as the Android® interface definition language (AIDL) or related interface definition language.

The secondary workspace 180 can be relied upon by a user of the client device 160 as a separate, work-related space for applications and data separate from that of the primary workspace 170, which can be used for personal applications and data. The logical separation (e.g., separate memory spaces, limited interface calls, limited inter-process communications, and other separations) between the primary workspace 170 and the secondary workspace 180 can be maintained in part by the operating system executing on the client device 160, such as by enforcement through the operating interconnect services 186. For the purpose of mobile device management, the management service 120 should be capable of administering the suite of applications installed on the secondary workspace 180, in addition to controlling access to the functions performed and data processed by the applications.

Continuing to FIG. 3, at step 214, the process can include the operating interconnect services 186 returning a callback to the interface service 174 as a confirmation that the secondary workspace 180 was created. The callback can be returned to the client agent 172 or the interface service 174 depending upon which requested the creation of the secondary workspace 180 at step 212.

At step 216, the process can include the interface service 174 installing the interface service 182 in the secondary workspace 180. Because the interface service 174 is recognized in the client device 160 as the administrator or owner of the secondary workspace 180, the interface service 174 can be authorized by the operating system of the client device 160 to install the interface service 182 in the secondary workspace 180. The interface service 182 is a corollary to the interface service 174, but executes within the secondary workspace 180 rather than in the primary workspace 170. Because it executes in the secondary workspace 180, the interface service 182 is capable configuring certain operating characteristics for the secondary workspace 180, such as which accounts are associated with it. Once the interface service 182 installed, the interface service 174 can conduct inter-process communications with the interface service 182, and the interface service 174 can control or direct the operations of the interface service 182 through inter-process communications.

After the secondary workspace 180 is established and the interface service 182 installed, the secondary workspace 180 can be associated with the alternate persona account which was created by the management service 120 at step 206. The token for the alternate persona account was returned to the client device 160 at step 210. To that end, at step 218, the process can include the interface service 174 forwarding the token for the alternate persona account to the interface service 182.

At step 220, the process can include the interface service 182 associating the alternate persona account with the secondary workspace 180. For example, the interface service 182 can communicate with the account administrator 150 to associate the alternate persona account with the secondary workspace 180 with reference to the token. As part of that association process, the account administrator 150 can return an account services identifier to the interface service 182 at step 222. The account services identifier is a unique identifier for the secondary workspace 180 in association with the alternate persona account and can be tied to an account or device codename for the client device 160.

Continuing to FIG. 4, at step 224, the process can include the interface service 182 returning the account services identifier to the interface service 174. Here, the account services identifier, which is tied to an account associated with the secondary workspace 180 for the client device 160, is passed from the secondary workspace 180 to the primary workspace 170 where the interface service 174 and the client agent 172 execute. In turn, the process can include the client agent 172 returning the account services identifier to the management service 120 at step 226 using communications over the network 190. Alternatively, rather than the interface service 182 returning the account services identifier to the interface service 174 at step 224 before it is returned to the management service 120 at step 226, the interface service 182 can directly return the account services identifier to the management service 120.

At this stage in the process, the management service 120 has created the alternate persona account, the secondary workspace 180 has been established on the client device 160, and the alternate persona account has been associated with the secondary workspace 180 on the client device 160. Further, the management service 120 has received the account services identifier, which uniquely identifies the secondary workspace 180 in association with the alternate persona account, from the client device 160. The management service 120 can now control which applications are visible or available for installation on the second workspace 180.

At step 228, the process can include the management service 120 performing an application administration call to the account administrator 150. The application administration call can be conducted through an API call to the account administration environment 130. The application administration call can be directed by an administrator using the management console 124. The application administration call can include the account services identifier of the secondary workspace 180 to uniquely identify that the call is for the administration of applications for the secondary workspace 180 of the client device, in particular, as opposed to the primary workspace 170.

As an example, the application administration call can identify, using one or more application blacklists, whitelists, or other manifests, which ones of the applications 144 will be visible (or not visible) to the client device 160 for installation to the secondary workspace 180 during searches for the applications 144. The application administration call can also identify which ones of the applications 144 are available for download and installation, required to be installed, and capable or permitted to be uninstalled to the secondary workspace 180. The application administration call can also identify which ones of the applications 144 are pushed down for installation to the secondary workspace 180, possibly using a notification service.

At step 230, the process can include the account administration environment 130 installing one or more applications to the secondary workspace 180. The applications can be installed at the request of a user of the client device 160, pushed down for installation to the secondary workspace 180, or both. One or more of the applications can be those identified during the application administration call at step 228. The applications can be installed, in part, at the direction of the interface service 182 of the secondary workspace 180.

The flowcharts in FIGS. 2-4 show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Both the enterprise computing environment 100 and the account administration environment 130 can include at least one processing circuit. Such a processing circuit can include, for example, one or more processors and one or more storage or memory that are coupled to a local interface. The local interface can include, for example, a data bus with an accompanying address/control bus or any other suitable bus structure. Similarly, the client devices 160 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120, the account administrator 150, and/or other components can be stored in one or more storage devices and be executable by one or more processors in the environments 100 and 130. Similarly, the agents, services, applications and/or other components described herein can be stored in one or more storage devices and be executable by one or more processors in the client device 160.

The management service 120, the account administrator 150, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 120, the account administrator 150, and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for multi-persona enrollment management, comprising:
   querying, by a client device, a management computing environment to establish an alternate persona workspace in the client device;
   receiving a token for the alternate persona workspace from the management computing environment;
   creating the alternate persona workspace in the client device based on the token from the management computing environment;
   associating an alternate persona account with the alternate persona workspace;
   forwarding the token from a primary persona workspace in the client device to the alternate persona workspace by inter-process communications; and
   receiving, by the client device, a notification to install at least one application in the alternate persona workspace from an account administration environment of the alternate persona account.

2. The method according to claim 1, wherein associating the alternate persona account with the alternate persona workspace comprises accessing the alternate persona account through an account administration environment using the token.

3. The method according to claim 1, wherein the account services identifier comprises a unique identifier for the alternate persona workspace.

4. The method according to claim 1, further comprising forwarding the account services identifier from the alternate persona workspace to a primary persona workspace in the client device by inter-process communications.

5. The method according to claim 4, wherein the alternate persona workspace is separate from the primary persona workspace in the client device.

6. The method according to claim 1, wherein the management computing environment controls availability of at least one application in the alternate persona workspace through an application administration call to the account administration environment.

7. A non-transitory computer-readable medium embodying program code for multi-persona enrollment management that, when executed by a client device, directs the client device to at least:
   query a management computing environment to establish an alternate persona workspace in the client device;
   receive a token for the alternate persona workspace from the management computing environment;
   create the alternate persona workspace in the client device based on token from the management computing environment;
   associate an alternate persona account with the alternate persona workspace;
   forwarding the token from a primary persona workspace in the client device to the alternate persona workspace by inter-process communications; and
   receive a notification to install at least one application in the alternate persona workspace from the account administration environment of the alternate persona account.

8. The non-transitory computer-readable medium according to claim 7, wherein, to associate the alternate persona account with the alternate persona workspace, the client device is further directed to at least access the alternate persona account through an account administration environment using the token.

9. The non-transitory computer-readable medium according to claim 7, wherein the account services identifier comprises a unique identifier for the alternate persona workspace.

10. The non-transitory computer-readable medium according to claim 7, wherein the client device is further directed to at least forward the account services identifier from the alternate persona workspace to a primary persona workspace in the client device by inter-process communications.

11. The non-transitory computer-readable medium according to claim 10, wherein the alternate persona workspace is separate from the primary persona workspace in the client device.

12. A system for multi-persona enrollment management, comprising:
- a memory device configured to store computer-readable instructions thereon; and
- at least one processing device configured, through execution of the computer-readable instructions, to at least:
  - query a management computing environment to establish an alternate persona workspace in a client device;
  - receive a token for the alternate persona workspace from the management computing environment;
  - create the alternate persona workspace in the client device based on token from the management computing environment;
  - associate an alternate persona account with the alternate persona workspace;
  - forward the token from a primary persona workspace in the client device to the alternate persona workspace by inter-process communications; and
  - receive a notification to install at least one application in the alternate persona workspace from the account administration environment of the alternate persona account.

13. The system according to claim 12, wherein, to associate the alternate persona account with the alternate persona workspace, the at least one processing device is further configured to at least access the alternate persona account through an account administration environment using the token.

14. The system according to claim 12, wherein the account services identifier comprises a unique identifier for the alternate persona workspace.

* * * * *